United States Patent [19]

Sharp

[11] Patent Number: 5,192,054

[45] Date of Patent: Mar. 9, 1993

[54] PREFABRICATED SIMULATED WROUGHT IRON AND LIKE FENCING SYSTEMS AND METHODS

[76] Inventor: Ivan Sharp, 5413 N. 3100 West, Amalga, Utah 84335

[21] Appl. No.: 645,164

[22] Filed: Jan. 24, 1991

[51] Int. Cl.⁵ .............................................. E04H 17/16
[52] U.S. Cl. .......................................... 256/24; 256/73; 256/22; 256/65
[58] Field of Search ............... 256/24, 21, 22, 73, 256/65, 19, 66

[56] References Cited

U.S. PATENT DOCUMENTS 3,315,943  4/1967  van den Broek .................. 256/22
3,822,053  7/1974  Dailey ................................. 256/22
4,074,893  2/1978  Coltrin ............................. 256/65 X

FOREIGN PATENT DOCUMENTS 111386  11/1917  United Kingdom ................. 256/73

Primary Examiner—Andrew V. Kundrat

[57] ABSTRACT

A fencing system which utilizes coated steel to simulate wrought iron fencing and which comprises prefabricated sections of fence comprised of steel, the length of which can vary, ground or floor-anchored post members to which the fence sections attach using novel connectors. An ornament adorns each top vertical member of each fence section. Novel fence gate structure is also disclosed.

21 Claims, 6 Drawing Sheets

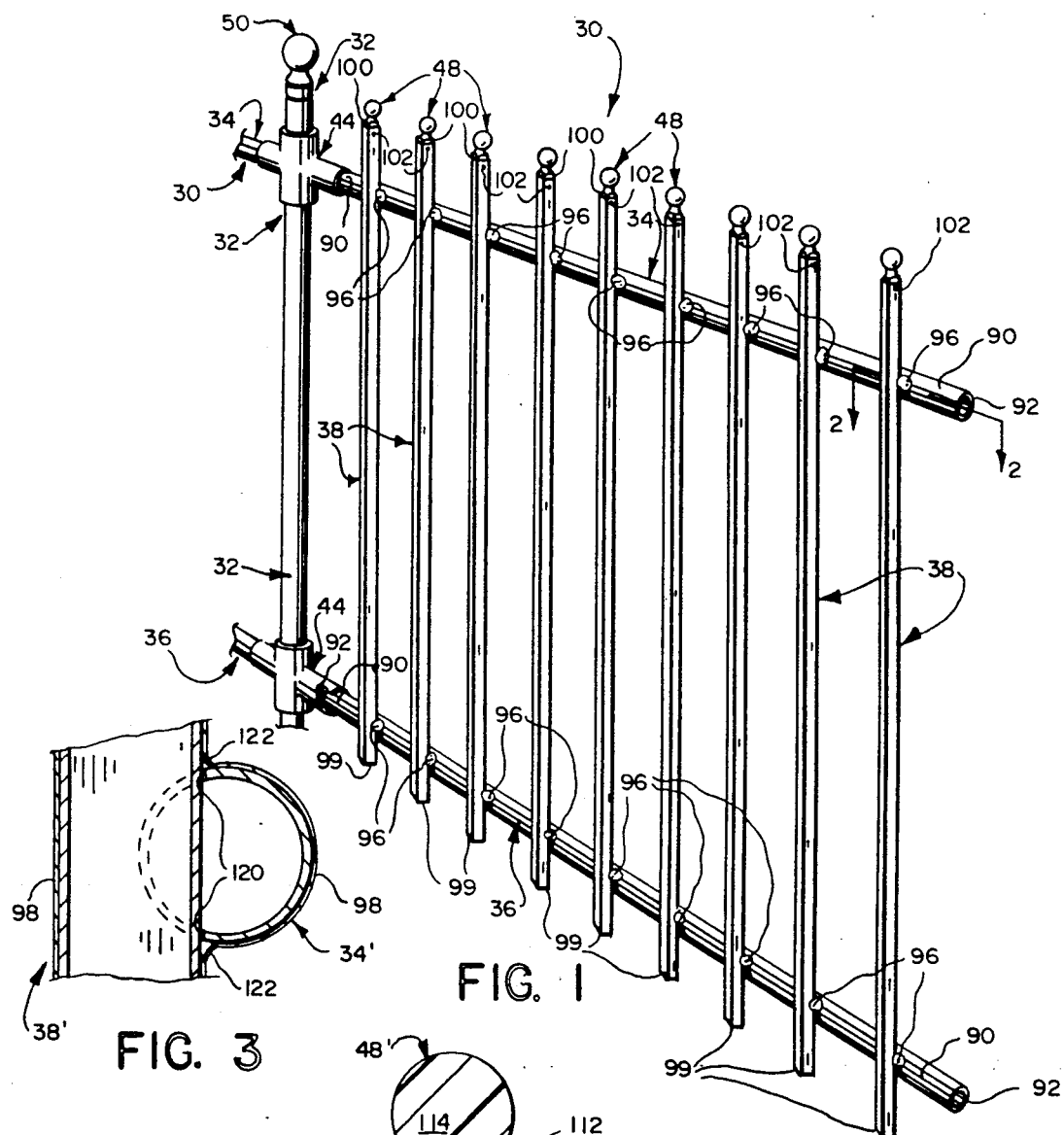
FIG. 1
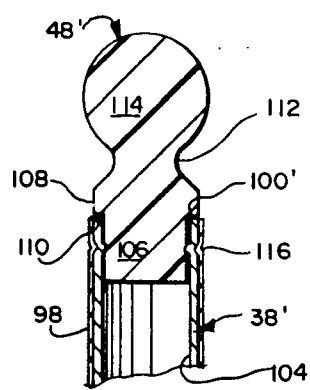
FIG. 3
FIG. 4
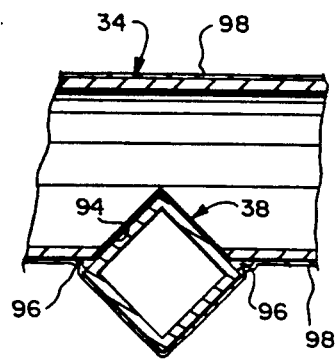
FIG. 2

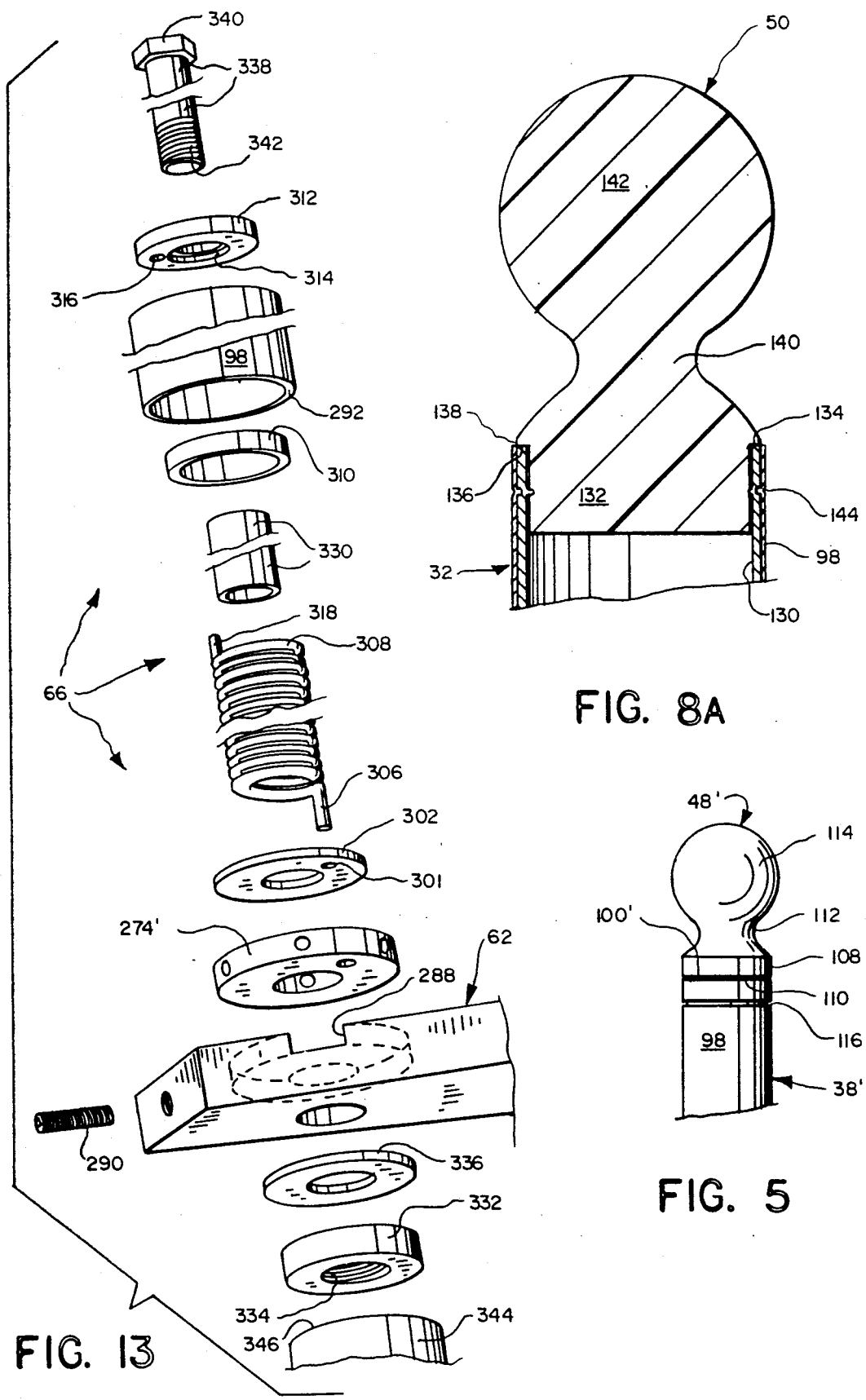

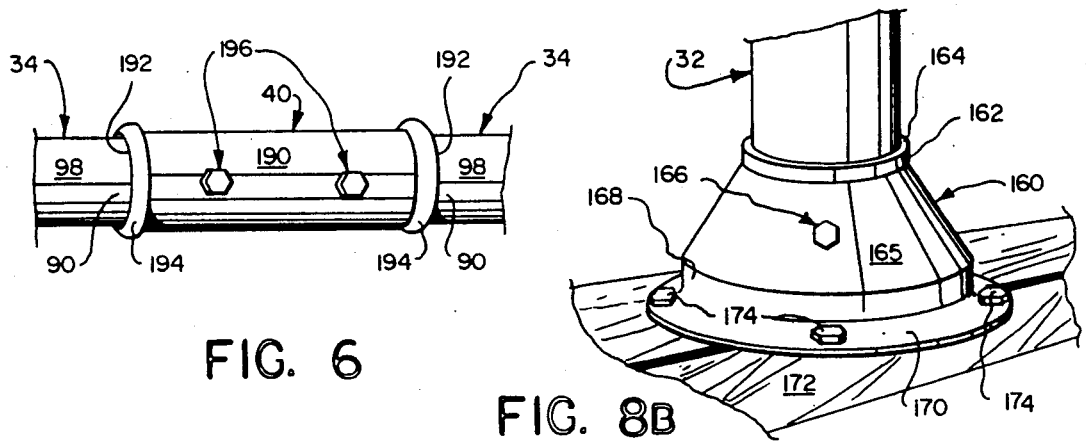
FIG. 6
FIG. 8B
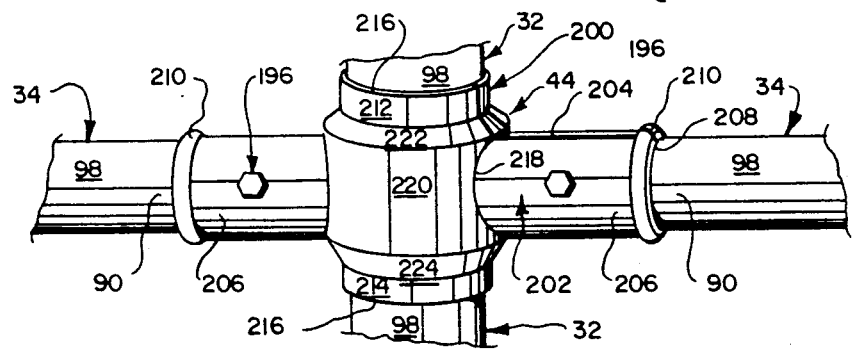
FIG. 9
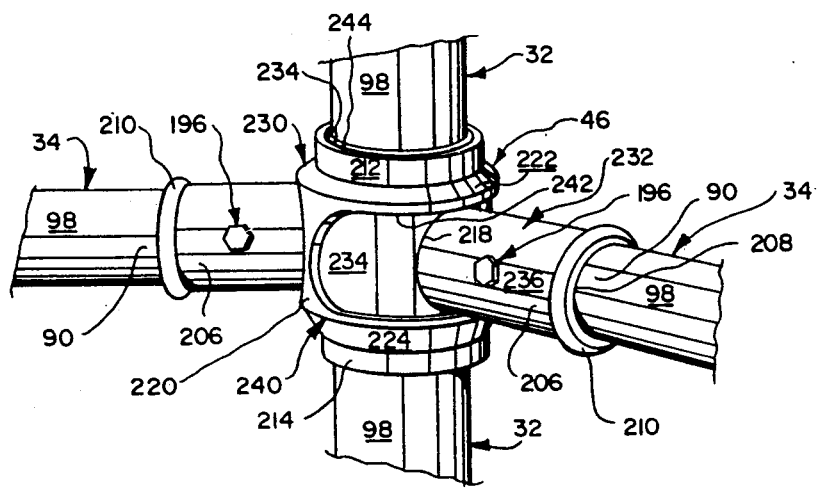
FIG. 10

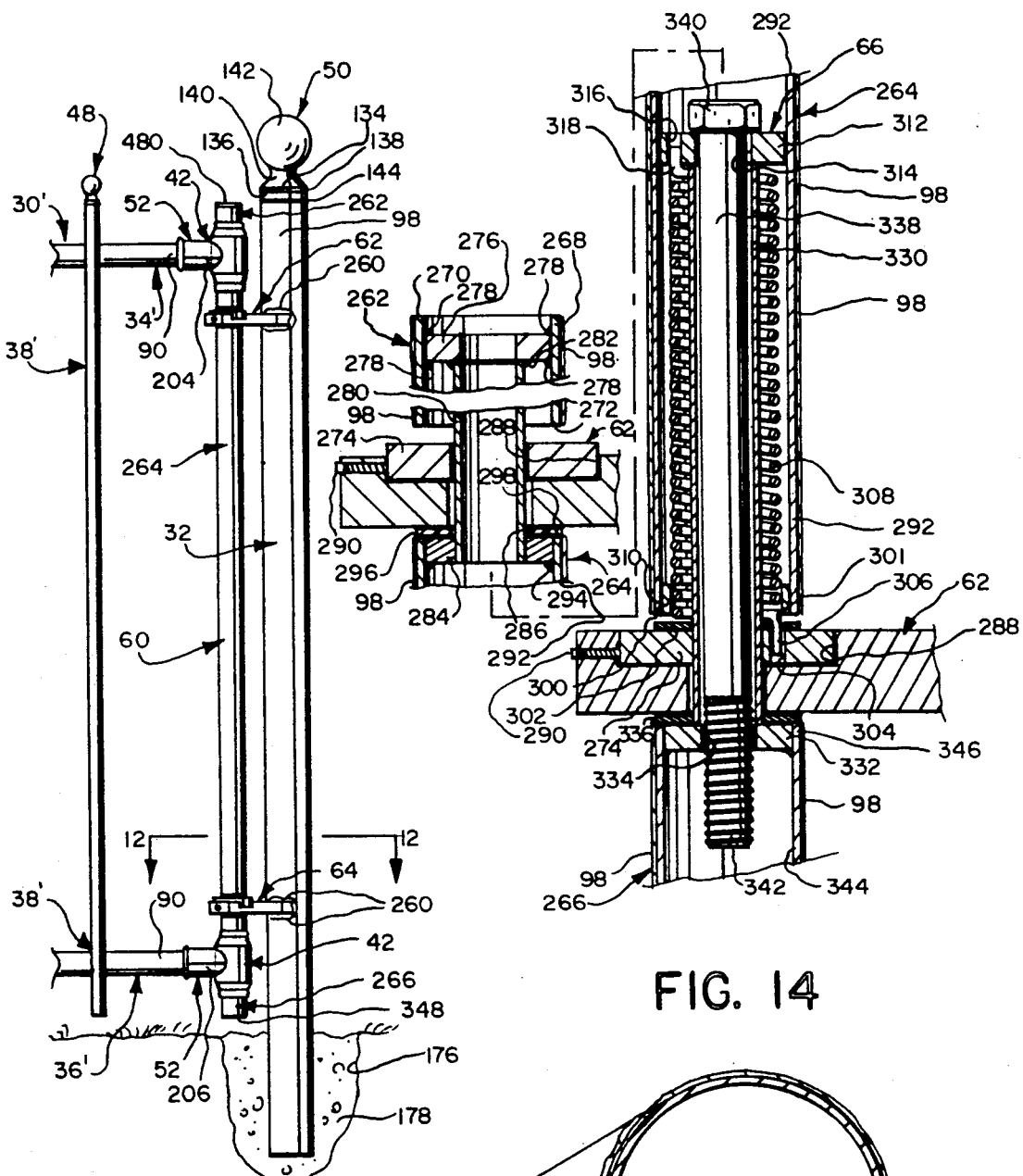
FIG. 11
FIG. 14
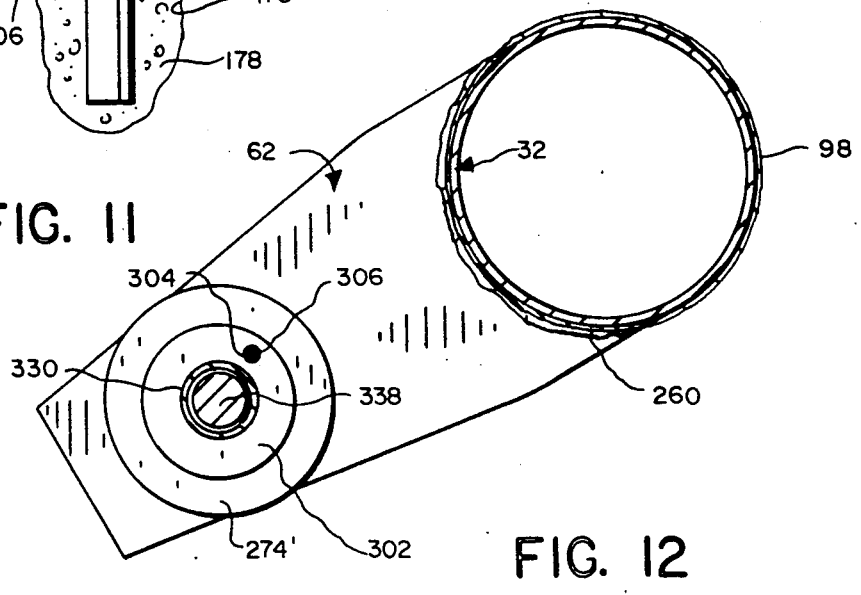
FIG. 12

PREFABRICATED SIMULATED WROUGHT IRON AND LIKE FENCING SYSTEMS AND METHODS

FIELD OF INVENTION

The present invention relates to the manufacture and erection of fence and more particularly to prefabricated simulated wrought iron and like fencing systems, and related methods, which are long lasting, attractive and relatively inexpensive.

RELATED ART

Five forms of residential and industrial (commercial) fence are well known. One type comprises masonry fencing, typically constructed of concrete, with or without reinforcing steel, or of masonry bricks or blocks, typically supported by concrete footings.

A second type comprises the well-known board fence wherein typically one-inch wooden planks, having, for example, an 8", 10" or 12" width, are placed edge-to-edge in a vertical orientation and nailed to upper and lower horizontal rails, such as 2"×4"s. The rails are secured to wooden posts which are anchored in the ground.

A third type of fence comprises a picket fence, which is very similar to the board fence, except the vertical picket members are spaced from each other by a predetermined distance and, typically, the top of each picket comprises a tapered pointed edge.

A fourth type of fence comprises chain link fence, which comprises spaced steel posts anchored in the ground (typically by use of concrete encasement). The posts are normally galvanized to prevent oxidation, as is the chain link mesh itself. The chain link mesh is of predetermined height and spans in vertical disposition between the posts. While this type of fence is strong and normally effective for purposes of security, it has very little aesthetic value.

A fifth type of fence is wrought iron which, while highly aesthetic, is very expensive, often prohibitively so.

Each of the above-mentioned types of fence present disadvantages, including but not limited to, lack of durability, poor visual appearance, excessive purchase price and difficult and costly to install. Gates for related art fencing systems are not typically self-retracting, lack aesthetic appeal and often, in time, sag and, therefore, are no longer able to swing and/or latch correctly.

BRIEF SUMMARY AND OBJECTS OF THE INVENTION

In brief summary, the present invention overcomes or substantially alleviates the above-mentioned problems of the related art and comprises novel fencing systems and related methods, which is long lasting, relatively inexpensive and attractive, both initially and years later.

In its preferred form, the present fencing system utilizes coated steel to simulate wrought iron fencing and comprises prefabricated sections of fence, the length of which is variable, post members to and by which the fence sections attach and are supported using novel connectors. Ornamental top closures preferably adorn each vertical member of the present system. Novel gate structure also preferably forms a part of the present system.

With the foregoing in mind, it is a primary object of the present invention to overcome or substantially alleviate problems of the related art by providing novel fencing systems, and related methods.

It is a further significant object to provide novel, long lasting, relatively inexpensive and lastingly attractive fencing systems, and related methods.

It is another important object to provide simulated wrought iron fencing systems, and related methods.

A further consequential object of the present invention is the provision of novel prefabricated sectionalized fencing systems comprising steel, and related methods.

Still another paramount object is the provision of novel connectors for a fencing system.

An additional object of importance is the provision of novel ornaments for a fencing system.

It is also a significant object to provide a novel gate and novel gate structure for a fencing system.

These and other objects and features of the present invention will be apparent from the detailed description taken with reference to the accompanying drawings.

BRIEF DESCRIPTION OF THE DRAWINGS

FIG. 1 is a fragmentary perspective of one presently preferred embodiment, in accordance with principles of the present invention, specifically illustrating a prefabricated section of fence secured by cross connectors to a ground-engaging post, only one of which is shown for ease of illustration;

FIG. 2 is an enlarged cross-section taken along lines 2—2 of FIG. 1;

FIG. 3 is a cross-section similar to FIG. 2 illustrating a further embodiment of the present invention comprising, a vertical spindle member which is circular in cross-section as opposed to a square vertical spindle as is illustrated in FIGS. 1 and 2;

FIG. 4 is a fragmentary cross-section of the top end of a vertical spindle member, circular in cross-section and adorned with an ornament or emblem disposed in crimped male/female relationship with the top of the spindle member;

FIG. 5 is a fragmentary elevation view of the subject matter of FIG. 4;

FIG. 6 is a fragmentary perspective of a sleeve coupler or connector by which two horizontally-directed fence members are connected;

FIG. 8A is an enlarged fragmentary cross-section taken along lines 8A—8A of FIG. 7;

FIG. 8B is an enlarged fragmentary elevation of the lower end of a post anchored to a floor by a boot;

FIG. 9 is a fragmentary perspective of a cross-connector by which two horizontally-directed fence members are exteriorly joined to a vertical post;

FIG. 10 is a fragmentary perspective of a corner-forming connector by which two horizontal fence members are exteriorly connected to a vertical corner-forming post so as to form a predetermined included angle between two horizontal members typically less than 180°;

FIG. 11 is an elevational view illustrating one way in which a fence gate, in accordance with the present invention, is cantilevered secured to a vertical post;

FIG. 12 is an enlarged view, taken along lines 12—12 of FIG. 11;

FIG. 13 is an exploded perspective of a fence gate return torsion spring mechanism;

FIG. 14 is a fragmentary cross-section of the torsion spring return mechanism of FIG. 13;

DETAILED DESCRIPTION OF THE ILLUSTRATED EMBODIMENTS

Figure 16:
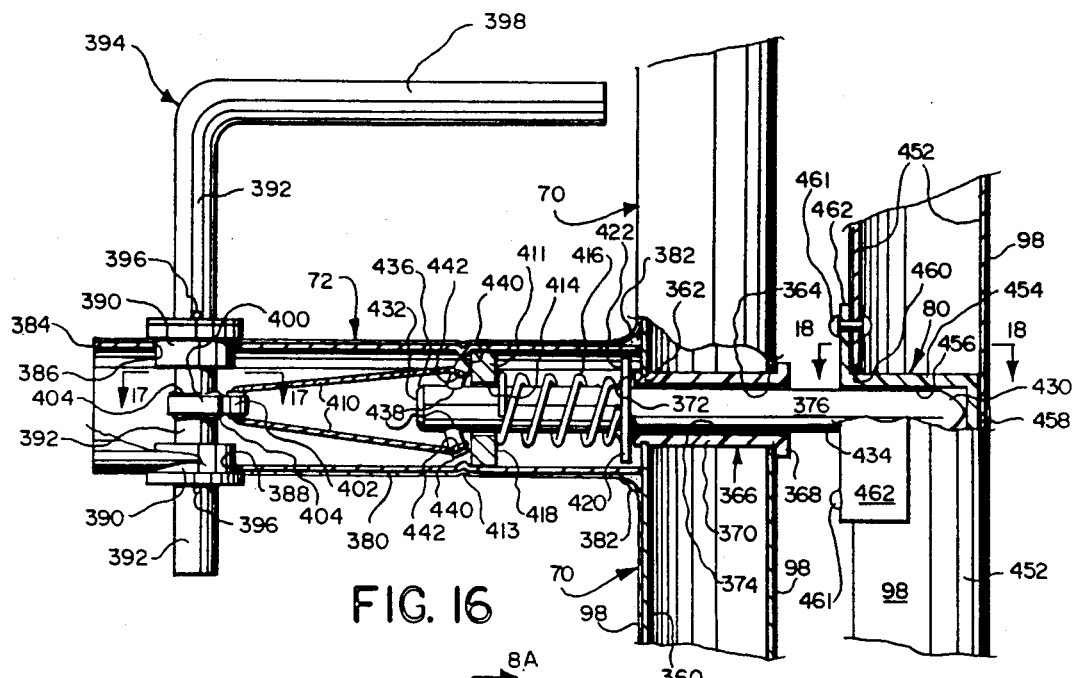
FIG. 16 is an enlarged cross-sectional view of the latch mechanism, taken along lines 16—16 of FIG. 15.

Reference is now made in detail to the drawings wherein like numerals are used throughout to designate like parts. Broadly, the present invention comprises fencing systems and related methods, sections of which are preferably prefabricated and which are easily assembled in the field without the requirement of great training or substantial technical capability resulting in installed fences and/or fence gates, all of which are long lasting, attractive and relatively inexpensive. In its presently preferred form, this invention utilizes steel components which accommodate welding of one component to another and which can readily be externally powder-coated using conventional techniques to simulate wrought iron.

Specifically, the present invention contemplates factory, plant or other prefabrication of fencing sections one of which, generally designated 30, is illustrated in FIG. 1. The fence sections may be of varying length and are intended to span above the ground between two vertically-extending posts, generally designated 32, which are anchored into the ground or to a floor or the like.

Each fence section 30 comprises at least an elongated upper horizontal member, generally designated 34, and an elongated lower horizontal member, generally designated 36. The horizontal members 34 and 36, depending on the terrain to be fenced, may have a vertical component. Each fence section 30 comprises a plurality of spaced, elongated, vertically-directed elongated members or bars, generally designated 38, each of which is permanently anchored to both horizontal members 34 and 36.

Externally-applied, collar-forming connectors are used to join, for various purposes, fence sections 30 to vertical posts 32. These connectors take the form of collars which comprise a straight or 180° collar connector, generally designated 40 (FIG. 6), T-collar connector, generally designated 42 (FIG. 7), a cross connector, generally designated 44 (FIG. 9) and a corner-forming collar connector, generally designated 46 (FIG. 10), which is angularly adjustable in either direction through a range of 90° either way. Typically, each of the connectors has an interference fit connection to the post and horizontal member or members with which it is associated. Fasteners, such as bolts, are also used in conjunction with certain connectors.

The present invention contemplates utilization of hollow cold rolled or extruded steel components, which facilitate ease of assembly by standard welding procedures. When hollow steel members are used to form the vertical members 38, each is equipped with a telescopically-inserted ornament, generally designated 48, at the hollow top thereof. Similarly, when hollow tubular material is used to form posts 32, it is preferred that each be equipped with a telescopically-inserted top ornament, generally designated 50. It is preferred that the ornaments 48 and 50 be formed from synthetic resinous material, using conventional injection molding techniques and are conventionally pigmented so as to be visually compatible with the remainder of any fencing installation. For example, in installations where the exterior of a fencing installation is to replicate wrought iron by powder coating, for example, the top ornaments 48 and 50 would be similarly pigmented.

Figure 15:
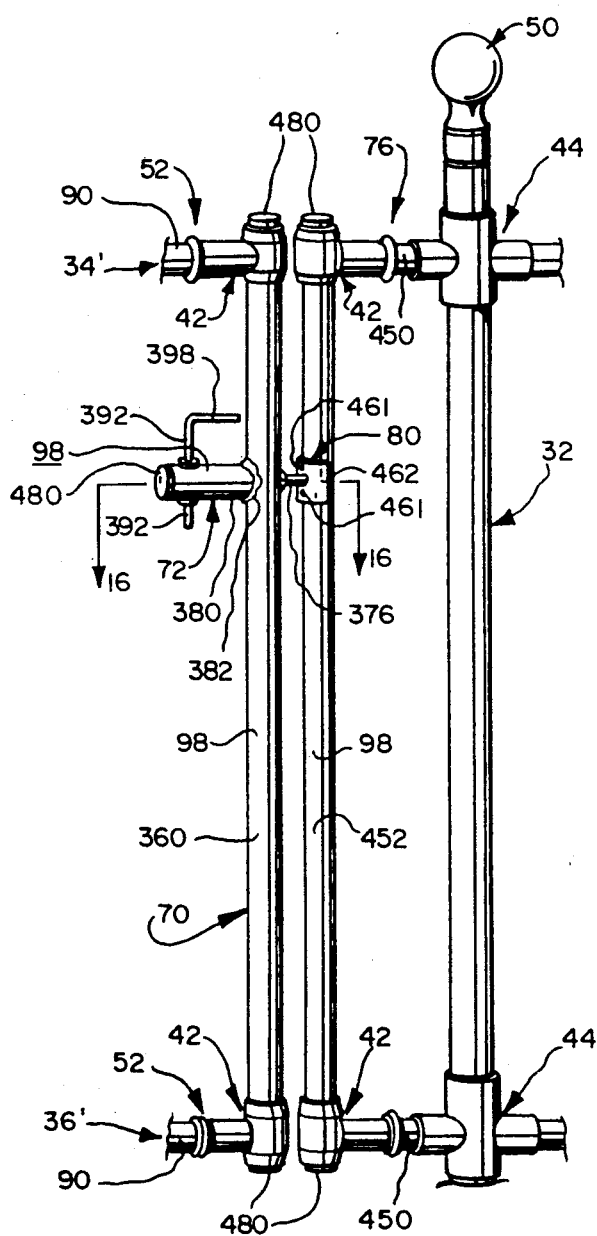
FIG. 15 is a fragmentary perspective, illustrating a portion of a presently preferred fence gate equipped with a presently preferred latch structure in accordance with the principle purposes of the present invention together with a latch-receiving structure illustrated as being cantilever mounted to a fence post.

Fencing systems according to the present invention may also comprise utilization of a swinging fence gate, generally designated 52 (FIGS. 11 and 15). The swing fence gate 52 is illustrated as comprising horizontal members 34' and 36' and vertical members identical or similar to vertical members 38' connected to the horizontal members 34' and 36'. The members 34', 36' and 38' are preferably welded together to form a gate fence frame. The swing fence gate 52 is preferably post-mounted, as illustrated in FIG. 11, and comprises a gate-mounting rotatable member, generally designated 60, which is supported above the ground or floor by an associated post 32 using upper and lower lugs, generally designated 62 and 64, respectively.

As explained in greater detail hereinafter, the gate-mounting member 60 is selectively rotatable and is biased to a closed gate position by an internal torsion gate return spring mechanism, generally designated 66 and illustrated in FIGS. 13 and 14.

Figure 19:
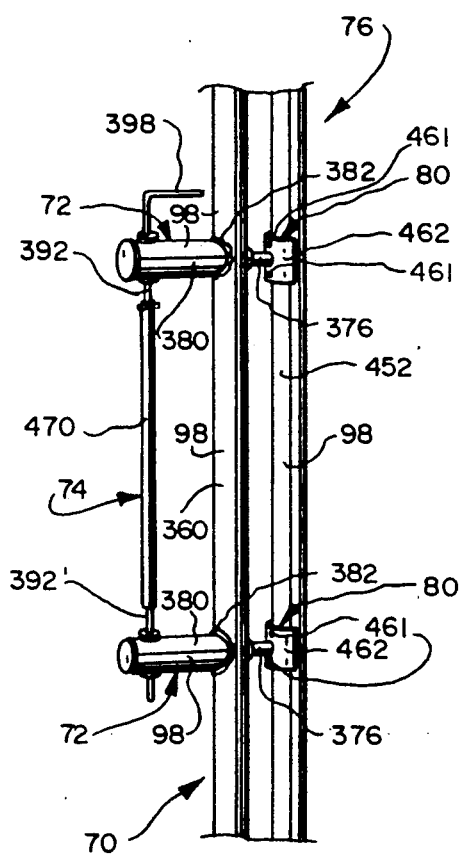
FIG. 19 is a fragmentary perspective of a second, double latching fence gate latch mechanism.

The swinging fence gate 52 also comprises a vertically-directed latch bar, generally designated 70 (FIGS. 15, 16 and 19). The vertical gate latch member 70 carries either a single self-biased latch mechanism, generally designated 72 (FIGS. 15 and 16), or a double latch mechanism, generally designated 74 (FIG. 19).

The present invention also contemplates use of a latch-receiving frame member, generally designated 76, which is illustrated in FIGS. 15 and 19 as being mounted to a post 32. The latch-receiving frame 76 is equipped with either one recess to receive one latching plunger of the latching mechanism 72 (FIG. 15) or two recesses which receive respectively the latching plunger of the two-latching mechanisms 72 (FIG. 19). In the illustrated embodiments, the latch receiving recess structure carried by the fixed frame member 76 is in the form of a plastic insert, generally designated 80.

Specific reference is once more made to FIG. 1 and to fence section 30 illustrated therein. Each horizontal member 34 and 36 of fence section 30 is illustrated as being comprised of a cold roll circular steel tube which comprise a hollow interior and define free support ends 90, each terminated in a blunt edge 92. Each end 90 projects a predetermined distance beyond the last vertical member 38 of the fence section 30. The upper horizontal bar 34 of the fence section 30 illustrated in FIG. 1 comprises a plurality of bird mouth notches 94. See FIG. 2. The notches 94 are uniformly spaced one from the next and are sized, in the embodiment of FIG. 1, so as to snugly receive substantially all of the exterior surface of two of four sides of one vertical member 38, in the manner illustrated in FIG. 2. When one vertical member 38 is assembled in one notch 94 in member 34 and one notch 94 in member 36, conventional weldments 96 are formed, using conventional welding techniques, on each side of each notch 94 to rigidly and inseparably connect the vertical member 38 to the horizontal members 34 and 36. This process continues until fence section 30 is complete.

Ultimately, where simulated wrought iron is desired, conventional powder-coating techniques are used to create an external coating on each component of the assembled fence section 30, which visually highly resembles wrought iron. This coating is illustrated throughout the drawings by the designation 98.

Ultimately, the fence section 30 comprises a rigid frame exhibiting four free ends 90, which are used as explained hereinafter, to connect the fence section 30 to vertical posts 32.

As can be seen from FIG. 1, the vertical members 38 extend a predetermined distance below the horizontal bar 36, terminating in blunt ends 99, which are disposed above the ground or floor surface to which the posts 32 are anchored. Thus, fence section 30 is solely supported, in its installed position, by two posts 32, one disposed at each end thereof.

Each vertical member 38, as illustrated, extends an equal predetermined distance above the upper horizontal member 34, terminating in a hollow blunt upper edge 100. A lower male extension of one of the ornaments 48, which is sized to snugly fit into the square hollow interior of member 38 is telescopically fitted into the hollow top of each vertical member 38 so as to substantially cover edge 100 and is there retained by two or more detent impressions 102. Each detent 102 in each member 38 is created after assembly of ornament 48 at the top end of the associated vertical member 38. Thus, each vertical member 38 is equipped with one top ornament 48, which may not be either easily or inadvertently removed. Other forms of detents may be used, including but not limited to, a continuous groove created in the top end of vertical member 38, which indents compressively into the synthetic resinous material from which the ornament 48 is formed. It is to be appreciated that the vertical members 38 may be circular in their cross section, as illustrated at 38' in FIG. 4. Each circular vertical member 38' terminates in an upper blunt edge 100'. Each vertical member 38' defines a circular hollow interior 104 into which a male cylindrical portion 106 of a synthetic resinous ornament 48' is telescopically inserted in snug, contiguous relation. The cylindrical extension 106 is diametrally expanded to a larger cylindrical section 108 at annular shoulder 110. Shoulder 110 is contiguous with and covers blunt edge 100', while the exterior of cylindrical portion 108 is exposed. Cylindrical portion 108 merges with a neck down portion 112 which in turn merges with a top sphere 114. Ornament 48' is illustrated as being solid throughout.

After insertion of the cylindrical projection 106 into the upper end of the vertical member 38', a conventional crimping tool is applied to the exterior of the vertical member 38' adjacent but slightly below the edge 100' and thereby forming an annular indentation or detent 116, which correspondingly annularly compresses the cylindrical portion 106 of the ornament 48' to thereby retain the ornament in its assembled position as illustrated in FIG. 4. FIG. 4 illustrates vertical member 38' as having been powder-coated with layer 98.

When vertical members 38', which are circular in cross section, are used to form a fence section, along with upper horizontal member 34, it is presently preferred that the upper horizontal member 34 be notched with circular notches 120, sized to contiguously receive the vertical member 38', as illustrated in FIG. 3. After circular notch 120 contiguously receives the exterior surface of vertical member 38' with which it is to be associated, a continuous weldment 122 is applied at the interface region immediately juxtaposed the notch 120, as best illustrated in FIG. 3. FIG. 3 further illustrates the application, after assembly, of powder coating 98.

Similarly, ornament 50 is united with the top end of each post 32. See FIG. 8A. Post 32 is illustrated in FIG. 8 as comprising an external powder coating 98 and a cold roll steel tube which is circular in cross section defining a circular interior 130 having a predetermined diameter. Ornament 50 comprises a cylindrical extension 132 at its lower end, which snugly fits telescopically into the hollow interior 130 of the top of post 32 a predetermined distance beyond the blunt top edge 134 thereof. Vertical extension 132 merges at shoulder 136 with an annular diametrally-enlarged portion 138. Shoulder 136 is illustrated as being contiguous with and concealing of edge 134. Enlarged annular portion 138 merges with a neck down region 140, which in turn merges with a sphere 142 of the emblem 50. Crimping, using known techniques, is achieved at annular detent site 144, as explained above, whereby the ornament 50 is compressively held against easy or inadvertent removal.

It is to be appreciated that the load of each installed fence section is transmitted to a ground site or a floor site through the vertical posts 32. These posts are anchored to the floor or in the ground or the like in a fixed, vertically-erect posture.

One suitable way of providing such load-transferring function as well as stability for each post in a floor-installed condition, is illustrated in FIG. 8B where a conically-shaped boot 160 is provided. Boot 160 is interiorly hollow and is preferably formed of steel. It comprises a top hollow annular segment 162 which terminates in a top blunt transverse edge 164 and merges with a conically-shaped central segment 165. Segment 162 has a uniform outside and a uniform inside diameter, the inside diameter being sized to snugly telescopically receive the lower end of post 32, as illustrated in FIG. 8. Post 32 is pre-apertured on opposed sides within the boot so that a nut and bolt assembly 166 is fitted therethrough and through apertures in the conical segment 164 to secure the post 32 to the boot 160.

Conical segment 165 merges with an annular segment 168, which in turn merges with a transversely-directed annular flange 170. Flange 170 is apertured at spaced locations. Wood screw fasteners 174 extend through the apertures in flange 170 and rigidly anchor the boot 160 to the wood floor 172.

In the alternative, the post 32 itself or, further in the alternative, a sleeve into which the lower end of the post is adapted to be inserted, is placed in a hole in the ground and encased within a concrete encasement to rigidly hold the post in secure, vertical load-transferring orientation. See FIG. 11, where hole 176 in the ground has the lower end of post 32 located therein, which is encased by concrete 178.

Reference is now made to the drawings specifically for the purpose of explaining in detail the various connectors disclosed herein. It is to be appreciated that it is presently preferred that each connector 40, 42, 44 and 46 be formed either from a suitable metal, using conventional techniques, or from rigid and high-impact resistant, load-transferring synthetic resinous material of any suitable type, preferably made by conventional injection molding techniques. Each connector is preferably formed of two pieces, although other connector-forming techniques may be used.

Connector 40 comprises a sleeve having a central portion 190, which is cylindrically hollow, the interior diameter of which is substantially the same as the outside diameter of horizontal member 34 at end 90. Thus, opposed ends 90 may be snugly linearly inserted oppositely into the hollow interior of the collar 40, through opposed end openings 192 located at diametrically-enlarged connector end flanges 194. Before insertion, however, each end 90 of the two horizontal members 34 are drilled to create two horizontally-aligned transversely-disposed apertures of a predetermined size. Similarly, collar 40 is formed with two sets of opposed aligned apertures which are sized similar to the apertures placed in the ends 90 so that upon insertion of the ends 90 into the collar 40 a predetermined distance, the two apertures in each end 90 are in alignment with one set of two apertures in the collar 40. Thereafter, a bolt of the bolt assembly 196 is inserted through each set of four aligned apertures and tightened to retain the assembly illustrated in FIG. 6. An additional connector 40 is used in the same way to similarly connect the ends 90 of two aligned lower horizontal members 36 of the two fence sections. Connector 40 is used in those instances where two fence sections 30 are connected one to another in end-to-end relationship so that the two sections, so connected, (rather than one) span between two posts 32, in the manner herein described. Connector 40 is also used with concrete and/or wood posts which provide horizontal members in the nature, for example, of dowels, pipes or studs sized and shaped to accommodate use of connector 40.

It is to be appreciated in respect to the following descriptions of the connectors 42, 44 and 46, that one of each would be used in conjunction with one or two horizontal members 34 and with one or two horizontal members 36 in respect to the same post 32. Since the installation is identical on any member 34 and any member 36, the following description will be limited to installations of connectors 42, 44 and 46 upon a post 32 in conjunction with one or two horizontal members 34. The ends 90 of the horizontal members are first transversely apertured to create opposed apertures therein of a predetermined diameter disposed horizontally so as to accommodate insertion of bolt fasteners through the aligned apertures in the associated connector and the aligned apertures in end 90, in the manner explained above.

The T-connector 42 comprises two clamshell halves 200 and 202. These halves are identical, but of opposite hand. Each half 200 and 202 contiguously engages 180° of the circumference of the associated post 32 and one-half of the one associated horizontal member 34. The other half circumscribes the remaining 180° of the post 32 and the remaining 180° of the horizontal member 34 at end 90. The clamshell halves 200 and 202 are aligned edge-to-edge at interface 204. When considered together, the T-connector 42 comprises a first collar 206, the interior collective diameter of which is substantially the same as the outside diameter of the end 90 of the associated horizontal member 34 so that end 90 may be snugly inserted into the hollow 208 of the sleeve 206 adjacent the end of flange 210 thereof. See FIG. 7. The collective collar 206 is oppositely apertured along a horizontal axis in such a way as to accommodate alignment of these two apertures as well as the apertures previously formed in the end 90. The insertion and tightening of a nut assembly 196 causes the T-connector 42 to clamp contiguously against the exterior surface of the end 90 of the horizontal member 34, as well as to contiguously clamp against the post 32.

Connector 42 also comprises collective collar segments 212 and 214, identical to each other though oppositely directed. Each collar 212 and 214 defines a hollow interior 216, the inside diameter of which is essentially the same as the outside diameter of the post 32, to accommodate the aforementioned clamping action.

The collar 206 merges collectively at site 218 with an enlarged hollow central segment 220 of the connector 42 while collars 212 and 214 merge with the central section 220 via truncated conical sections 222 and 224, respectively.

Reference is now made to FIG. 9 which illustrates cross connector 44. Cross connector 44 is identical in all respects to connector 42 except that a second horizontal collar 206 is formed therewith and is connected to end 90 of second horizontal member 34. Since connector 42 has already been described, no further description of connector 44 is required. It is, however, to be appreciated that while a two-piece clamshell connector is presently preferred for certain connections of the present fencing system, the present invention is sufficiently broad to contemplate use of connectors are, for example, in a T and cross configuration, which are formed as one piece.

Reference is now made to FIG. 10, which illustrates a corner connector 46, by which an angle is imparted to a fence during installation. The connector 46, as illustrated, accommodates adjustment in the angle of the corner between an included angle of 180° and an included angle of 90° in either direction, although the invention of FIG. 3 contemplates a corner of any included angle.

Connector 46 preferably comprises two clamshell portions which interrelate with each other, i.e., a portion generally designated 230 and a portion 232. Portion 232 comprises a sleeve 234 which contiguously compressively engages the exterior surface of the post 32. Accordingly, the sleeve 234 has an inside diameter substantially the same as the outside diameter of the post 32. A continuous collar 236 is also provided which is identical in its structure and function to collar 206 and has been correspondingly numbered. Collar 234 merges with collar 236 at interface 218.

Figure 7:
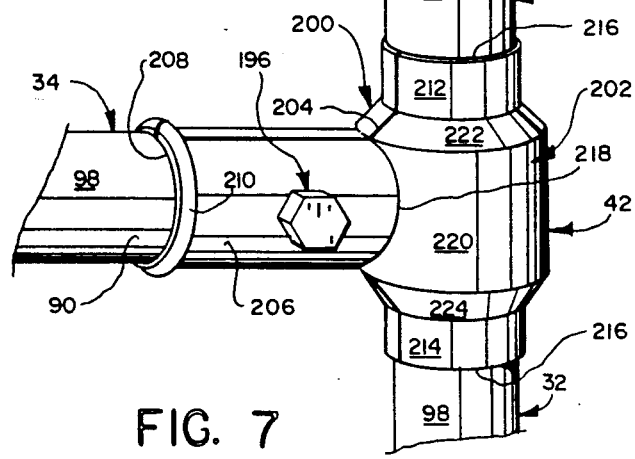
FIG. 7 illustrates a T-clamshell connector exteriorly joining a horizontal fence member to a post, the post having an ornament at the top thereof.

The second portion 230 of the connector 46 comprises a stepped post-surrounding collar portion, generally designated 240, which is substantially the same as collar segment 204, shown in FIG. 7, except for a 180° slot 242 placed in the hollow central wall 220. Since there is otherwise identity between collar portion 202 and collar portion 240, identical numerals have been used to identify identical parts and no further description is deemed necessary.

The collar 234 extends along the post 32 a distance equal to the length of the collar portion 240 whereby the annular walls 212 and 214 snugly engage the exterior of the collar 234 at sites 244. This engagement at top and bottom annular sites 244 is firm, but prior to placement and tightening of fasteners 196 accommodates relative rotation of the collar 240 in respect to the collar 234 for purposes of precisely selectively setting the included angle desired between the two sets of horizontal members 34 and 36, the size of the slot 242 and the size of the collar 236 accommodating said angle selection. Integral with the central collar portion 240 is horizontal member-engaging and connecting collar 206, as explained in detail heretofore.

From the foregoing, it is to be appreciated that the described connector clamps are positioned exteriorly of the horizontal members and the vertical posts to which each connect and establish rigid, although releasible unions. While the described connectors shown in FIGS. 9 and 10 accommodate connection to the horizontal members of two fence sections which are aligned one with another, it is to be appreciated that four T-connectors 42 may be used at any given post 32 where horizontal members of two fence sections are vertically offset one from the other. Ts which comprise a collar 206 not precisely at 90° to the post 32 may also be used where the horizontal members have a vertical component, as may be the case when a fence is installed along steep terrain.

The present invention, as mentioned earlier, contemplates utilization of a novel self-return swing fence gate, generally designated 52. See FIGS. 12-15. Fence gate 52 comprises a section of fence, generally designated 30', normally expected to be shorter in its length than fence section 30 and cantilever supported by only one post 32, for example, in the manner illustrated in FIG. 11. Gate fence section 30' comprises upper and lower horizontal members 34' and 36' which, except for length, are preferably fabricated, as earlier described in connection with fence section 30. Similarly, gate fence section 30' comprises a plurality of vertically-extending spaced members 38' preferably secured to the horizontal members 34' and 36', as described previously in connection with vertical members 38 and their attachment to horizontal members 34 and 36. The gate fence section 30' comprises two ends 90 of horizontal member 34' and two ends 90 of horizontal member 36'. One end 90 of member 34' and one end 90 of member 36' are respectively secured by a connector 42 to a gate mounting, generally vertically-directed swing mechanism 60.

Swing mechanism 60 is illustrated in FIG. 11 as being carried for rotation by lugs 62, each lug 62 being rigidly welded at sites 260 to the post 32 of FIG. 11 prior to powder coating of the post 32. The use of powder coating, however, as explained above, constitutes only one way in which the present invention may be implemented.

As explained herein in greater detail, the objective of the swing mechanism 60 is to self-retract the open gate to a closed position. Structurally, swing mechanism 60 comprises three exposed circular tubes, i.e., a top external tube generally designated 262, a central longer external 264, and a lower, relatively short exposed tube 266. The top tube 262 is illustrated as comprising an external powder coating 98 and as being formed of a relatively short cold roll steel tube 268. Steel tube 268 defines the uniform inside diameter which extends between a top blunt edge 270 and a bottom blunt edge 272. Edge 272 is spaced above the top surface of a disk 274 to accommodate rotation of the top tubular segment 262 as the gate is rotated. Top tubular segment 262 is connected to the central tubular segment by an annular disk 276, which has an outside diameter equal to the inside diameter of the steel tube 268. Disk 276 is welded at sites 278 to the interior of the steel tube 262. An interior tube 280, illustrated as having a hollow interior extends downwardly concentrically within the steel tube 268, tube 280 being rigidly anchored at its top end to disk 278 by annular weldment 282. Tube 280 extends rotatably through disk 274 and the associated lug 62. The lower end of the tube 280 is secured to an annular disk 284 by annular weldment 286.

The lug disk 274 is seated in an annular recess 288 fashioned in the top surface of the associated lug 62 and is secured against rotation by a set screw 290.

Central tubular segment 264 comprises a cold rolled steel circular tube 292 which is hollow and defines a uniform inside diameter throughout. The steel tube 292 is illustrated as having been powder coated at 98. The outside diameter of the disk 284 is substantially the same as the inside diameter of the steel tube 292 and is secured to the steel tube 292 by an annular weldment 294. Thus, tubular segment 262 and tubular segment 264 are rigidly connected and rotate together. A nylon washer 296 is illustrated as being interposed between the lug 62 and the annular disk 284 to reduce wear.

The steel tube 292 is illustrated as comprising a top blunt edge 298 which is disposed in the same plane as the top surface of the disk 284. Steel tube 292 also comprises a bottom blunt edge 300, which is spaced a substantial distance above retarding nylon washer 302. The washer 302 rests upon a metal disk identical to the previously described metal disk 274 in a recess 288 disposed at the top surface of the lower lug 62.

The top lug 62 and the lower lug 62 are substantially identical. The lower metal disk 274' is identical to the previously described disk 274 except for the existence of a vertically-directed bore 304 which receives the lower vertical end 306 of a torsion spring 308. An annular sleeve 310 is connected by welding or the like at the interior surface adjacent the lower end 300 of the steel tube 292 for the purpose of centering the torsion spring 308. The torsion spring 308 comprises part of the return torsion spring mechanism 66 contained within the swing tube mechanism 60.

The disk 274 is nonrotatably-secured in static fixed position in the lug 62 with which it is associated by reason of a set screw 290. Accordingly, as the swing mechanism 60 is rotated (which causes rotation of tubular segments 262, 264 and 266), the lower end 306 of the torsion spring 308 is held in a fixed position.

Disposed internally of the steel tube 292 is a torsion disk 312, which has a central bore 314 of a relatively large diameter and an eccentric bore 316 of a relatively small diameter. The disk 312 is rigidly secured to the steel tube 292, preferably by welding from the exterior of the tube 292 prior to the application of coating 98. Thus, as tube 292 rotates with the swing gate, the disk 312 also rotates. The upper vertically-directed end 318 is snugly received within the aperture 316 so that end 318 also rotates with steel tube 292. This stresses the torsion spring 308, causing the memory of the spring 308 to urge the swing mechanism 60 and the swing gate from the described open condition back to a closed condition where no torsion stress is exerted upon the torsion spring 308 by the swing mechanism 60. An interior tube 330 is concentrically disposed within the spring 308. The tube 330 preferably comprises cold rolled steel tube which abuts disk 312 at its top end. The tube 330 rotatably passes through the metal disk 274' and abuts a steel disk 332 at its bottom end. Thus, tube 330 is held in position by compression imparted by disks 312 and 332. Steel disk 332 forms part of the tubular segment 266 and defines a central threaded bore 334. The disk 332 is spaced below the bottom surface of the lower lug 62, that space being illustrated as containing a nylon washer 336 for wear purposes. A shaft 338 passes through the disk 312, the torsion spring 308, the disk 274', the lower lug 62 and the disk 332 to hold the torsion return assembly together. The shaft 338 terminates at its top in a nut 340 formed as one piece with the shaft 338. The shaft 338 comprises threads 342 at its lower end, which threadedly engage and mate with the threads at aperture 334 of disk 332. By rotating the disk 274', the degree of compression exerted upon the torsion spring 308 can be adjusted so that the force of the return exerted upon the gate is selectively adjustable. Care is to be taken so that tightening of the disk 274' does not cause the torsion spring 308 to bind.

The low tubular segment 266 comprises a hollow steel tube 344 which is interiorly hollow and defines a uniform inside diameter. The exterior of the steel tube 344 is illustrated as having received a powder coating 98. The internal diameter of the tube 344 is essentially the same as the outside diameter of the disk 332 which is fitted therein, the disk 332 being nonrotatably secured to the tube 344, preferably by welding. The tube 344 comprises a top blunt edge 346 which is illustrated as lying in the same horizontal plane as the top surface of the disk 332. The tube 344 terminates in a blunt lower edge 348. See FIG. 11.

It is to be appreciated while only one return torsion spring mechanism 66 has been described, and that disposed immediately above the lower lug, the present invention contemplates placement of the torsion spring return mechanism in such a location as to cooperate with the top lug 62 in the fashion described or, if desired, the utilization of two torsion spring mechanisms of the type described, one used in conjunction with each lug 62.

The present invention also contemplates utilization of either a single or double latch mechanism 72 as a feature of the self-return swing fence gate. Specifically, free ends 90 of the gate fence horizontal members 34' and 36' are respectively joined to a vertical member 70 by utilization of top and bottom connectors 42. Vertical latch member 70 comprises, preferably, a steel tube 360 which is illustrated as being hollow at its interior defining there a uniform diameter. Tube 360 is illustrated as being generally powder coated at 98. Steel tube 360 in the embodiment of FIGS. 15 and 16 comprise a pair of aligned horizontally-directed apertures 362 and 364. A hollow plastic insert 366 is interference fit through the apertures 362 and 364 so as to be self-retained. Insert 366 is essentially T-shaped and hollow comprising an annular flange 368 formed as one piece with a hollow annular extension 370 which spans from the flange 368 tightly across the apertures 364 and 362 terminating in a blunt annular edge 372. Thus, the plastic insert 366 defines a hollow passageway 374 through which a latch plunger 376 is caused to manually reciprocate as hereinafter more fully explained.

A steel tube housing 380, forming a part of the latch mechanism 72, extends inwardly toward the fence gate section from the tube 360. The hollow tube housing 380 is secured to the tube 360 preferably by welding at annular weldment 382 which is disposed adjacent one end of the tube 380. The opposed end 384 of the tube 380 is also blunt. Adjacent blunt edge 384 are opposed vertically-oriented apertures 386 and 388 in the tube 380. Plastic bushings 390 are interference-fit retained in each aperture. Each bushing 390 comprises a central bore through which the distal portion 392 of a manual handle 394 rotatably passes. Removal of the manual handle 394 from the rotatable connection with the bushings 390 (FIG. 16) is prevented by opposed transverse pins 396 which are force-fit received into the distal portion 392 of the manual handle exterior of each bushing 390. The manual handle 394 comprises a horizontally-directed, manually-gripping portion 398 which is formed as one piece with but disposed at 90° to the distal portion 392.

A rigid cam 400 comprises eccentric lobe 402 is anchored by weldments 404 to the distal portion 392 of the manual handle 394 midway between the bushings 390 along the central axis of the tube 380. Manual handle 394 is, therefore, preferably formed of steel, as is the cam 400.

Lobe 402 comprises a vertical bore 406 into which a plastic insert 408 is force fit. The plastic insert 408 defines a bore which parallels the bore 406 through which a cable or wire rope 410 passes for purposes yet to be explained. For purposes of ease of insertion, the diameter of the cable 410 is less than the diameter of the bore defined by the plastic insert 408.

A U-shaped metal washer 411 is located internal of the tube 380, being disposed transverse thereto. Washer 411 is rigidly held within the interior of the tube 380 against movement toward the shaft 392 by an annular crimp 413 in the tube 380. Washer 411 comprises a horizontally-directed slot 414 through which the trailing end of plunger 376 extends and reciprocates responsive to manual manipulation of the actuator 398. The U-shaped washer 411 accommodates placement thereof in an axial orientation for placement within and removal from tube 380.

With continuing reference to FIG. 16, a return coil spring 416 is interposed between side 418 of washer 410 and an annular abutment plate 420. Abutment plate 420 is welded to plunger 376 at the location indicated in FIG. 16 and one end of spring 416 bears against surface 422 of abutment plate 420. As explained hereinafter, the spring 416 is in its maximum extended position as illustrated in FIG. 16 and is compressed so as to have a shorter effective length and to be thereby compressively stressed when the handle actuator 398 is rotated to retract the latching plunger 376.

As can be seen from FIG. 16, the plunger 376 is relatively long, having a length similar to the overall length of the tube 380 but positioned so as to extend therefrom with the distal end extending through the plastic insert 366 at bore 374 a distance well beyond the metal tube 360 to latch as hereinafter more fully explained. The latching plunger 376 comprises a tapered distal tip 430 and a blunt proximal end 432. Between ends 430 and 432, the latching plunger 376 has a solid circular cross section of uniform diameter forming cylindrical surface 434. Surface 434 merges with blunt end 432 at chamfer surface 436. The plunger 376 is angularly tapped at sites 438 into which metal studs 440 are force-fit so as to angle away from the handle shaft 392.

Figure 17:
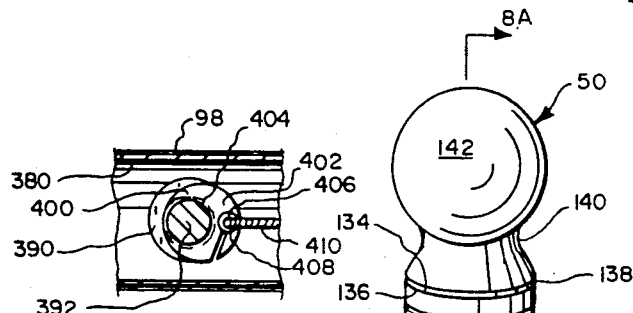
FIG. 17 is a fragmentary cross-sectional view taken along lines 17—17 of FIG. 16.
Figure 18:
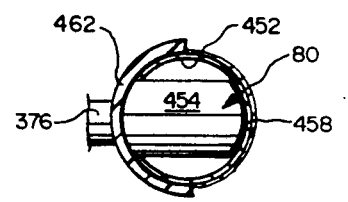
FIG. 18 is a fragmentary cross-sectional view taken along lines 18—18 of FIG. 16.

The cable 410 comprises two ends comprising loops 442 secured around the metal studs 440, respectively. Thus, when handle 398 is rotated from the position illustrated in FIG. 16 from right to left, the actuator shaft 392 likewise rotates displacing the cam 400 from the position of FIG. 17 to a position where the lobe 402 does not extend directly toward the plunger 376. The cable is caused to follow the rotation of the lobe 402 which applies tension through the cable 410 to the metal studs 440, causing the plunger 376 to be retracted linearly through bore 414 thereby unlatching the latching plunger 376 as hereinafter explained. The described rotation of the actuator handle 398 and actuator shaft 392, in effect, shortens the length of the spring 416 compressing it between the washer 411, which is fixed in its position to tube 380 and abutment plate 420, which travels with the plunger 376. Accordingly, when the handle 398 is manually released following retraction, the spring 416, bearing against the plate 420 at surface 422, again extends the plunger to its fully extended position.

It is to be appreciated that as presently preferred, the gate section 52 interrelates with an anchoring frame 76, which is carried by a post 32. See FIG. 15. The post 32 of FIG. 15 is illustrated as being disposed at one end of a fence section, such as fence section 30 of FIG. 1, being connected thereto by two cross connectors 44 as previously explained. Cross connectors 44 receive top and bottom a short horizontal member 450, each of which in turn is joined to a T-connector 42, top and bottom, which form part of the gate anchor frame 76. A vertical bar, in the form of a cold roll steel hollow tube 452 spans between and is connected to the top and bottom T-connectors 42, again as best illustrated in FIG. 15. The vertical circular hollow steel tube 452 is illustrated as being externally powder coated at 98. Tube 452 is horizontally apertured at 460 through one side in alignment with plunger 376. Preferably, a plastic insert 80 is inserted through the aperture 460. Plastic insert 80, as illustrated, is formed as one piece through use of conventional injection molding techniques from a rigid, durable synthetic resinous material and comprises a cylindrical lined, bore-defining body 454, which has a cylindrically-hollow interior 456 site to receive the distal end of the plunger 376. The blind bore terminates at end wall 458 within the tube 452. The plastic insert 80 also comprises an external curvilinear flange 462, which functions as a strike, plate for the tip 430 of the plunger 376 as the gate is closed. More specifically, when the gate is closed without benefit of manipulation of the actuator handle 398, the distal tip 430 of the plunger 376 makes contact with the curved exterior surface of the flange 462 whereby further displacement of the gate toward its closed position will cause the plunger 376, by reason of said engagement, to be retracted until the plunger 376 is aligned with the bore 456, at which time the plunger advances to its fully extended position. A pair of rivets 461 fasten the flange 462 to the tube 452. It is to be understood that where a post 32 is used as a latch-receiving structure, the post may be apertured and receive an insert so in the manner described above.

It is further to be appreciated that in some circumstances, two latching plungers 376 each equipped with a latch mechanism 72 may be used and interconnected so as to function simultaneously. One such configuration is illustrated in FIG. 19 wherein the actuator shaft 392 is extended and enlarged at connector rod 470 from a top latching location to a lower latching location where connection rod 470 is joined to a reduced diameter actuator shaft 392'. Shaft 392' is identical to shaft 392 and functions in exactly the same way as described above, except shaft 392 is without an actuating handle 398 and relies upon the actuating handle 398 of the upper latch mechanism 72. The upper latch mechanism 72 is identical to the lower latch mechanism 72 of the embodiment of FIG. 19 and, accordingly, no further description is deemed necessary, the vertical member 452 being equipped with two sets of aligned horizontal apertures and two plastic inserts 80, one in alignment with the latching plunger 376 of the top latching mechanism 72 and one in alignment with the latching plunger 376 of the lower latching mechanism 72.

It is to be appreciated that the latch mechanism 72 can be mounted on a vertical member of a fence gate or a fence gate latch receiving frame, at the bottom thereof to engage a floor or grounded carried latch receiving recess, in the manner described above, to hold the gate or latching receiving frame in a desired fixed position.

It is to be appreciated that plastic plugs 480 are preferably telescopically force fit into each exposed, otherwise uncapped hollow end of each fence member to improve appearance and reduce the likelihood of injury. See FIGS. 11 and 15, for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Fencing apparatus comprising:
   a section of fence comprising at least two spaced horizontal members comprised of steel, each horizontal member comprising opposed exposed ends;
   a plurality of vertical bars comprised of steel spanning between and above and below the horizontal members;
   means attaching each vertical bar to each horizontal member;
   a floor or ground-engaging, vertically-extending post disposed at each end of the fence section the posts being spaced one from the other the distance substantially the same as the length of horizontal members;
   a two part clamshell connector spanning between each post and each adjacent end of each horizontal member, each connector means defining a two part first collar contiguously surrounding the associated post and a two part second collar contiguously surrounding an end of the associated horizontal steel member whereby weight of the section of fence is transferred directly across the connector means to the posts the two part connector being held in position by at least one releasably fastener passing centrally through both connector parts.

2. Fencing apparatus according to claim 1 further comprising an ornament carried at a top end of each vertical bar.

3. Fencing apparatus according to claim 1 wherein each vertical bar is hollow and further comprising an exposed ornament comprising synthetic resinous material carried at a hollow top of each vertical bar in telescopic relationship.

4. Fencing apparatus according to claim 3 wherein each telescopic relationship comprises crimped union means.

5. Fencing apparatus according to claim 1 wherein an exposed ornament is carried at a top end of each post.

6. Fencing apparatus according to claim 1 wherein each post is hollow and further comprising an exposed ornament comprising synthetic resinous material carried at a hollow top of each post in telescopic relationship.

7. Fencing apparatus according to claim 6 wherein each telescopic relationship comprises crimped union means.

8. Fencing apparatus according to claim 1 wherein the section of fence and the posts comprise an external coating.

9. Fencing apparatus according to claim 8 wherein the coating visually simulates wrought iron.

10. Fencing apparatus according to claim 1 further comprise fence gate means carried by one post so as to extend away from the fence section.

11. Fencing apparatus according to claim 1 wherein at least one post comprises concrete.

12. Fencing apparatus according to claim 1 wherein the connector means comprise means forming an acute angle fence corner.

13. Fencing apparatus comprising:
- a section of fence comprising at least two spaced horizontal members comprised of steel, each horizontal member comprising opposed exposed ends;
- a plurality of vertical bars comprised of steel spanning between and above and below the horizontal members;
- weldment means attaching each vertical bar to each horizontal member;
- a floor or ground-engaging, vertically-extending post disposed at each end of the fence section;
- connector means spanning between each post and each adjacent end of each horizontal member, each connector means comprising first collar means contiguously surrounding the associated post and second collar means contiguously surrounding an end of the associated horizontal steel member whereby weight of the section of fence is transferred across the connector means to the posts;
- at least some of the weldment means being located in notched means located in at least one of the associated horizontal member and vertical bar.

14. Fencing apparatus according to claim 1 further comprising a second fence section carried by one of said posts by connector means so as to extend away from the first mentioned fence section.

15. Fencing apparatus according to claim 14 wherein the second fence section comprises a horizontal length different from the horizontal length of the first mentioned fence section.

16. Fencing apparatus according to claim 14 wherein the second fence section comprises a maximum elevation different from the maximum elevation of said fence section.

17. Fencing apparatus according to claim 10 wherein the fence gate means are rigidly connected to one of said posts.

18. Fencing apparatus according to claim 1 wherein the lower end of at least one of said posts is anchored in the ground.

19. Fencing apparatus according to claim 1 wherein the lower end of at least one of said posts is anchored to a floor.

20. Fencing apparatus according to claim 1 wherein the horizontal members are disposed at an angle to a horizontal plane.

21. Fencing apparatus comprising:
- a section of fence comprising at least two spaced horizontal members comprised of steel, each horizontal member comprising opposed exposed ends;
- a plurality of vertical bars comprised of steel spanning between and above and below the horizontal members;
- means attaching each vertical bar to each horizontal member;
- a floor or ground-engaging, vertically-extending hollow post disposed at each end of the fence section;
- a connector spanning between each post and each adjacent end of each horizontal member, each connector comprising a first collar contiguously surrounding the associated post and a second collar contiguously surrounding an end of the associated horizontal steel member whereby weight of the section of fence is transferred across the connector means to the posts;
- an ornament partially inserted into the upper end of at least one post;
- fastener means holding the ornament in position, the fastener means comprising an annular reduced diameter crimped region in the exposed top of the post.

* * * * *